(12) United States Patent
Oshimo

(10) Patent No.: US 6,848,256 B2  
(45) Date of Patent: Feb. 1, 2005

(54) BOOSTER

(75) Inventor: Hiroki Oshimo, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/385,997

(22) Filed: Mar. 11, 2003

(65) Prior Publication Data

US 2003/0172803 A1 Sep. 18, 2003

(30) Foreign Application Priority Data

Mar. 15, 2002 (JP) ........................................ 2002-073128

(51) Int. Cl.[7] .............................................. F15B 13/16
(52) U.S. Cl. ........................................ 60/545; 60/547.1
(58) Field of Search ............................... 60/545, 547.1; 108/161, 164

(56) References Cited

U.S. PATENT DOCUMENTS

| | | | |
|---|---|---|---|
| 4,620,750 A | * 11/1986 | Leiber | .......................... 60/545 |
| 4,709,969 A | 12/1987 | Heess et al. | ................... 60/545 |
| 4,824,187 A | * 4/1989 | Heess et al. | ................... 60/545 |
| 6,505,539 B2 | * 1/2003 | Schluter | ....................... 91/367 |

* cited by examiner

Primary Examiner—Thomas E. Lazo  
(74) Attorney, Agent, or Firm—Steinberg & Raskin, P.C.

(57) ABSTRACT

A booster of the present invention is structured to include one permanent magnet (first permanent magnet) 40 provided in an input rod 20, and the other permanent magnet (second permanent magnet) 51 forming a repulsive magnetic field between the second permanent magnet 51 and the first permanent magnet 40, and to apply a force amplified by a force received by the second permanent magnet 51 to an output rod 60 through a channel different from an output applying channel by an output applying member 30 to booster the inputted force. The booster can boost a force by applying a force to operate an inputting member without requiring such a negative pressure source or a hydraulic pressure source operated by a separate driving force different from a driving force to drive the inputting member as the conventional booster requires.

12 Claims, 11 Drawing Sheets

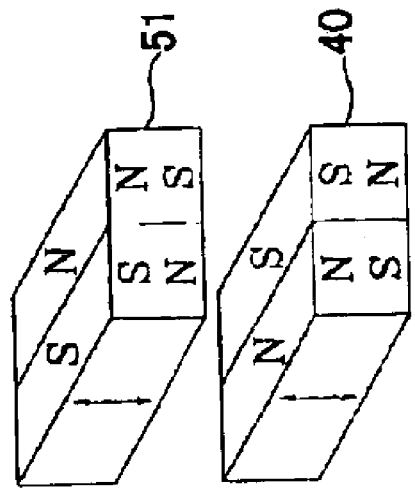
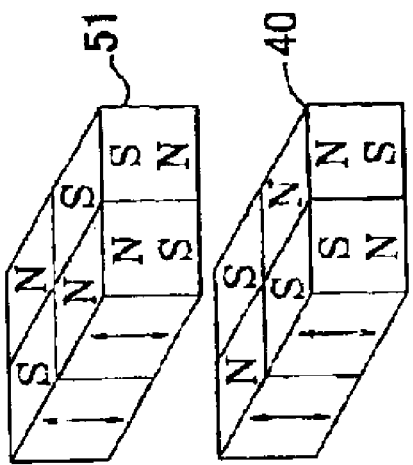
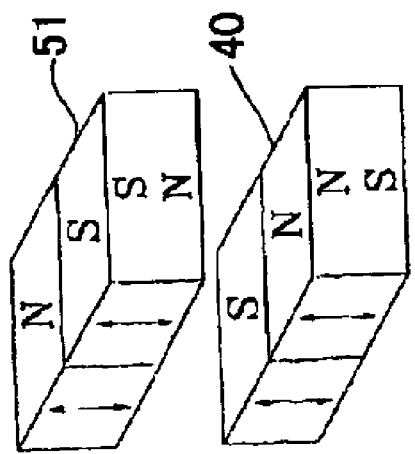
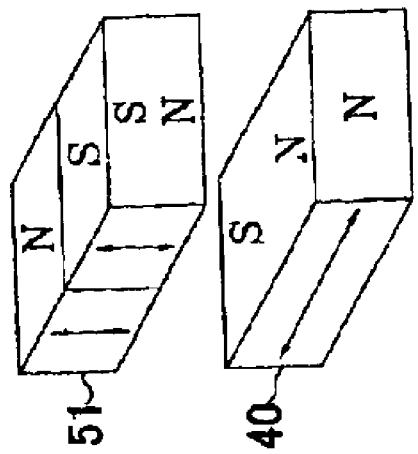
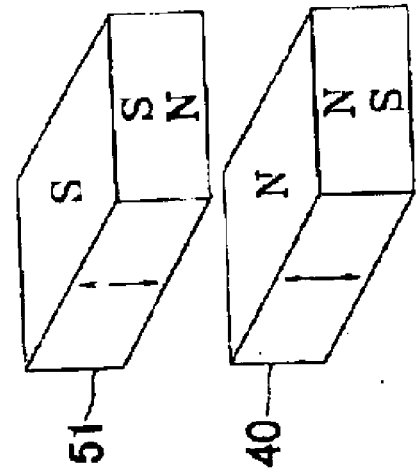
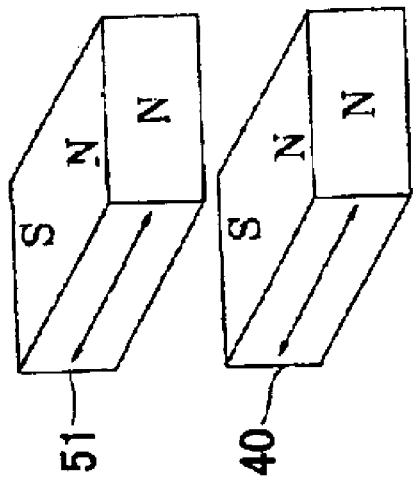
FIG. 4A  FIG. 4B  FIG. 4C
FIG. 4D  FIG. 4E  FIG. 4F

BOOSTER

BACKGROUND OF THE INVENTION

1. Field of the Invention

The present invention relates to a booster, especially relates to a booster used to a transportation machine such as an automobile and the like.

2. Description of the Related Art

For instance, a vacuum booster is structured in a manner that two rooms isolated by a power piston, and a power diaphragm are communicated to a negative pressure source such as an intake manifold of an engine, a vacuum pump, and so on, and the two rooms are kept in a negative pressure in a non-operational state. An atmospheric pressure is introduced into one room by actuating an inputting member through operation of a brake pedal and the like, so that the power piston is actuated by a pressure difference of both rooms. A power of the inputting member is boosted by a force generated in the power piston to output to an outputting member. Then, this output force is transmitted to a brake master cylinder or the like.

As described above, the conventional vacuum booster device requires a negative pressure source disposed completely different from a transmission channel for the power of the inputting member as a mechanism to boost, in addition to a force transmitted to the outputting member by the power of the inputting member operated with an operation member such as a brake pedal or the like. That is, the conventional vacuum booster requires a negative pressure source worked by a separate driving force different from a force to drive an inputting member. As a booster, a hydraulic booster, and a pneumatic booster as well as a vacuum booster can be cited. In the case of a hydraulic booster, a hydraulic pump and so on is necessary to be operated by an independent driving force as a source of generating a force to be amplified. Furthermore, in the case of the pneumatic booster, a compressor, a vacuum tank or the like for supplying compressed air is required additionally.

SUMMARY OF THE INVENTION

The present invention has been made in view of the above circumstance, and an object of the present invention is to provide a booster which requires no separate power generating source to drive with the help of an independent driving system to amplify an inputted force separately, and is able to amplify an input force only by applying a force to operate an inputting member, so that miniaturization of the device, reduction in production cost, and so on can be realized.

In order to achieve the above-described object, the present invention provides a booster, comprising:

In order to achieve the above-described object, the present invention provides a booster, comprising:

a first permanent magnet mounted on an inputting member; and an amplification transmission member, including the second permanent magnet arranged in a manner to face the first permanent magnet when the first permanent magnet moves by movement of the inputting member, and applying a force larger than the inputted force to an outputting member by the magnetic field formed by both permanent magnets.

The present invention provides the booster further comprising:

an output application member for applying an output force to the outputting member by movement of the inputting member, wherein the amplification transmission member, includes the second permanent magnet arranged in a manner to face the first permanent magnet when the first permanent magnet moves by movement of the inputting member, and applies a force larger than the inputted force to the outputting member through a channel different from the output application channel by the output application member due to a magnetic field formed by both permanent magnets.

The present invention provides the booster wherein the second permanent magnet constituting the amplification transmission member is arranged on the outside of the first permanent magnet to apply the force of the magnetic field formed by both of the permanent magnets in a direction different from the direction of movement of the inputting member.

The present invention provides the booster wherein the output application member comprises an elastic member connected directly or indirectly to the outputting member.

The present invention provides the booster wherein the booster is structured that the amplification transmission member includes a piston slidable in a cylinder by a force received by the second permanent magnet due to the magnetic field formed by both of the permanent magnets, and a pipe communicating to the cylinder at one end; and the outputting member includes a piston slidable in a cylinder communicating to the other end of the pipe, so as to convert the force received by the second permanent magnet into pressure for amplification.

The present invention provides the booster wherein the first permanent magnet and the second permanent magnet are arranged so that their same magnetic poles can face each other, and the other end of the pipe is connectedly communicated to a pressure chamber located on the back face side of the piston out of two chambers formed in the cylinder divided by the piston of the outputting member, and the piston can be enforced by repulsive magnetic field received by the second permanent magnet.

The present invention provides the booster wherein the first permanent magnet and the second permanent magnet are arranged so that their different magnetic poles can face each other, and the other end of the pipe is connectedly communicated to an opposite chamber located on the front face side of the piston out of the two chambers formed in the cylinder divided by the piston of the outputting member, and the piston can be enforced by reducing pressure in the opposite chamber by an attractive magnetic field received by the second permanent magnet.

The present invention provides the booster wherein the booster is structured that liquid is filled hermetically in the cylinder in which the piston of the amplification transmission member slides, in another cylinder in which the piston of the outputting member slides and in the pipe, so that the force received by the second permanent magnet can be converted to a hydraulic pressure to transmit to the outputting member.

The present invention provide the booster wherein a pressure receiving area of the outputting member is larger than a pressure receiving area of the piston of the amplification transmission member.

The present invention provides the booster wherein the amplification transmission member is provided with a linking mechanism connected to any portion of the outputting member, the linking mechanism has an interlocking member movable by a force received by the second permanent magnet.

The present invention provides the booster wherein a plurality of the amplification transmission members are provided, and the second permanent magnet disposed in each of the amplification transmission member is provided so as to face the first permanent magnet by movement of the inputting member.

The present invention provides the booster wherein the booster is structured to apply a preliminary load to the outputting member by the magnetic field formed between the second permanent magnets in the plural amplification transmission members before the first permanent magnet provided in the inputting member is positioned between the respective second permanent magnets.

The present invention provides the booster wherein the respective first permanent magnet in the inputting member has an arrangement of magnetic poles to be able to cancel the preliminary load acting to the outputting member by the magnetic field formed by the respective second permanent magnets before the respective first permanent magnet is positioned between the respective second permanent magnets of the plural amplification transmission members.

According to the invention, when the inputting member moves, the inputted force is amplified by the magnetic field formed by the first permanent magnet, and the second permanent magnet provided in the amplification transmission member to be transferred to the outputting member.

According to the invention, when the inputting member moves, the inputted force is transmitted to the outputting member by the output application member, and the inputted force is amplified by the magnetic field formed by the first permanent magnet and the second permanent magnet provided in the amplification transmission member, and the amplified force by the amplification transmission member is transferred to the outputting member.

According to the invention, since the second permanent magnet is arranged on the outside of the first permanent magnet, the second permanent magnet receives a force by a magnetic field formed by both permanent magnets in the direction substantially perpendicular to the direction of movement of the inputting member. Therefore, in addition to the output force to the outputting member by the output application member, a force amplified is applied from the direction different from the output application channel through the output application member.

According to the invention, the inputted force applied to the inputting member is transmitted to the outputting member through the elastic member.

According to the invention, the force received by the second permanent magnet is converted to a movement of the piston sliding in the cylinder to be transmitted to another piston of the outputting member slidable in another cylinder connected through the pipe.

According to the invention, the pressure chamber in another cylinder connected via the pipe is pressurized by the repulsive magnetic field received by the second permanent magnet to push another piston of the outputting member slidable in another cylinder.

According to the invention, the opposite chamber in another cylinder connected via the pipe is decompressed by the attractive magnetic field received by the second permanent magnet to move another piston of the outputting member slidable in another cylinder in the direction of attraction.

According to the invention, the force received by the second permanent magnet is converted into a hydraulic pressure to be transmitted to the outputting member.

According to the invention, the force received by the second permanent magnet is amplified further and transmitted to the outputting member.

According to the invention, the force received by the second permanent magnet is transmitted to the outputting member by a mechanical transmission via the linking mechanism.

According to the invention, since the input force is amplified and transmitted to the outputting member via plural amplification transmission members, the amount of displacement of the piston composing individual amplification transmission member can be made small, so that the force can be transmitted stably to the outputting member.

According to the invention, the preliminary load can be applied to the outputting member, and according to the invention, the preliminary load can be canceled. It should be noted that whether the preliminary load should be applied or not depends on a subject to be controlled according to the present invention, and a suitable structure is used by selecting appropriately.

BRIEF DESCRIPTION OF THE DRAWINGS

FIG. 4A to FIG. 4F are views showing examples of magnetic pole arrangement of a first permanent magnet and a second permanent magnet adoptable to the embodiment;

DETAILED DESCRIPTION OF THE PREFERRED EMBODIMENT(S)

Figure 1:
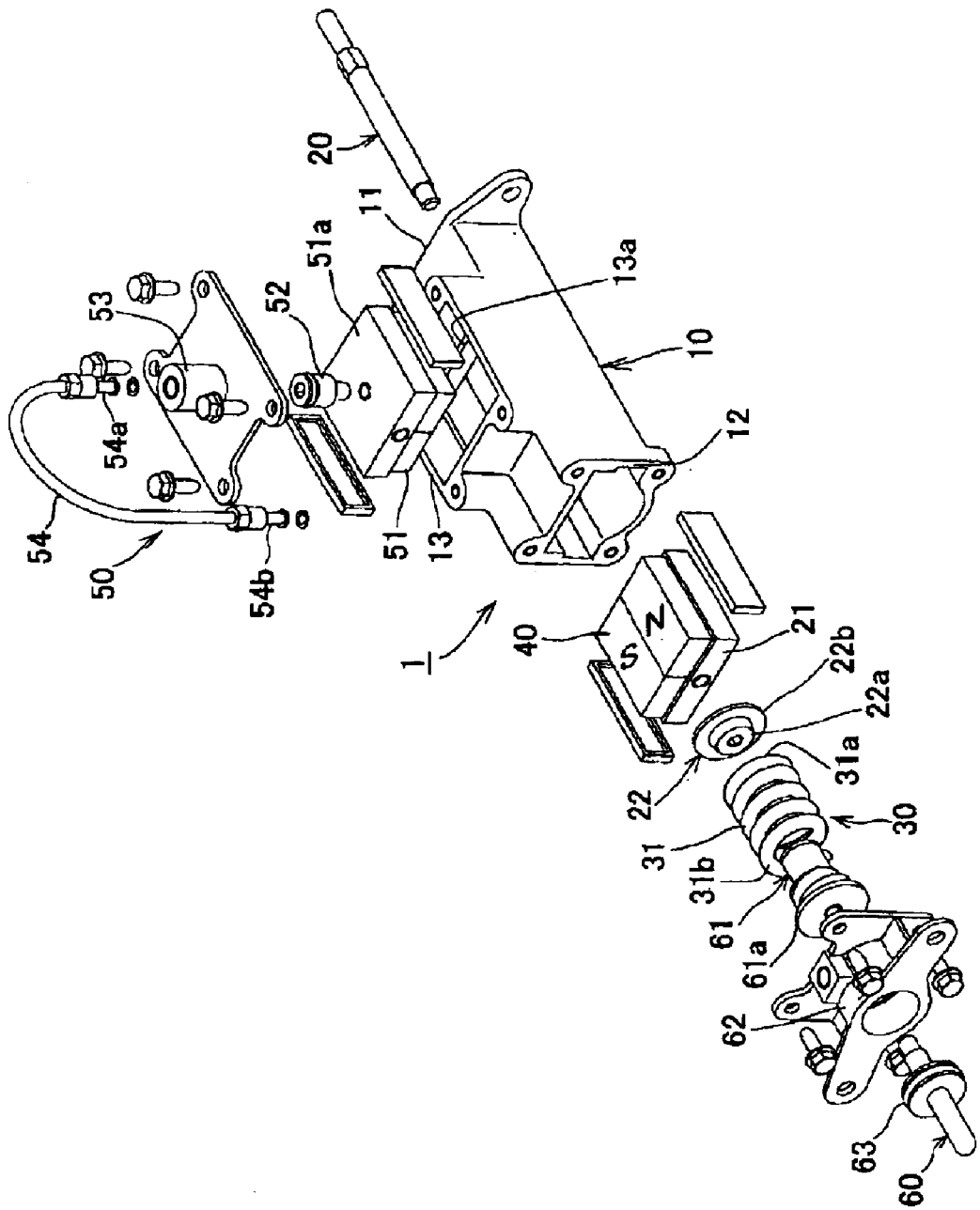
FIG. 1 is a perspective view showing a booster relating to an embodiment of the present invention.
Figure 2:
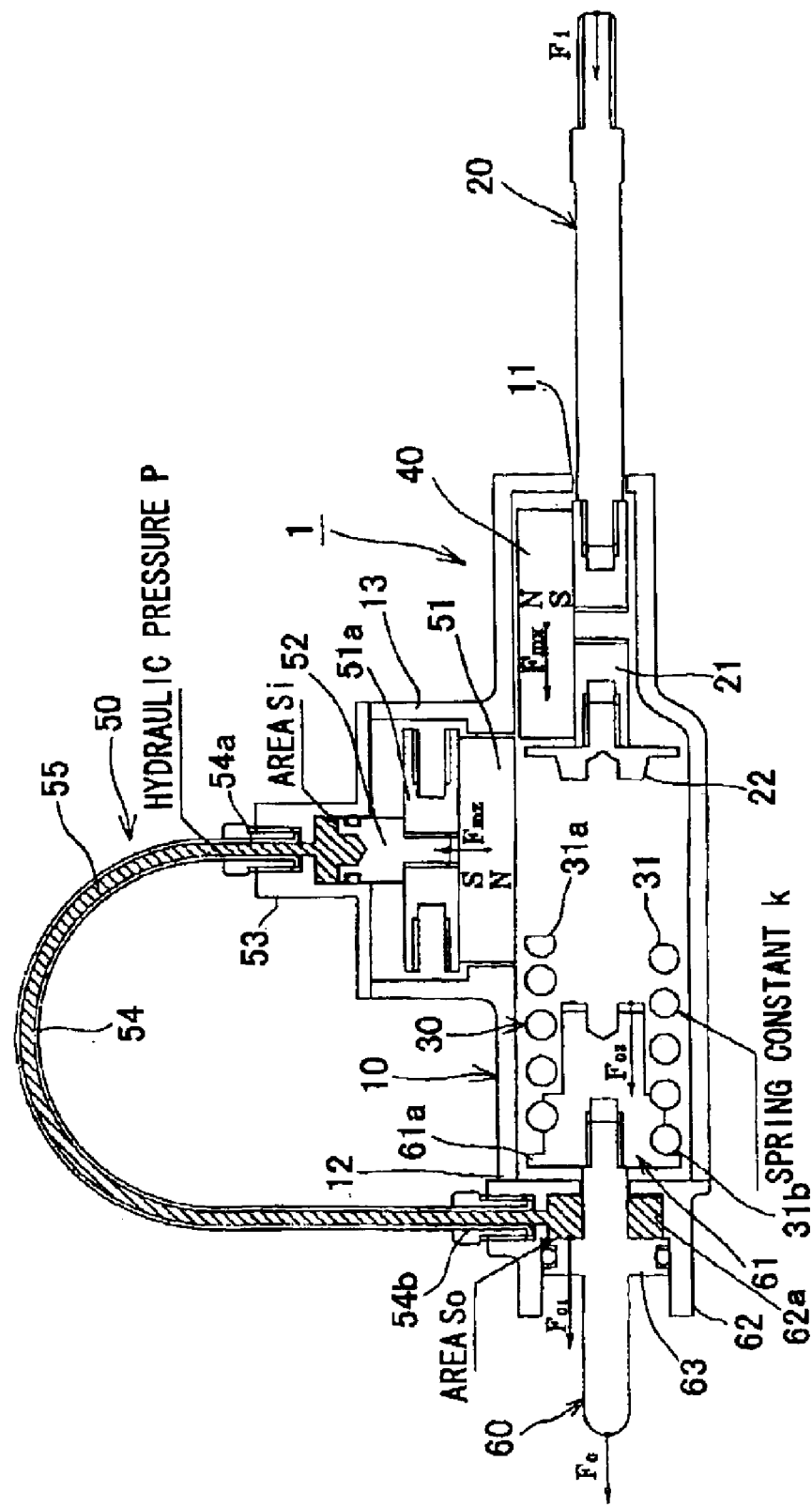
FIG. 2 is a schematic sectional view showing an inner structure in no-movement state of the booster relating to the embodiment.
Figure 3:
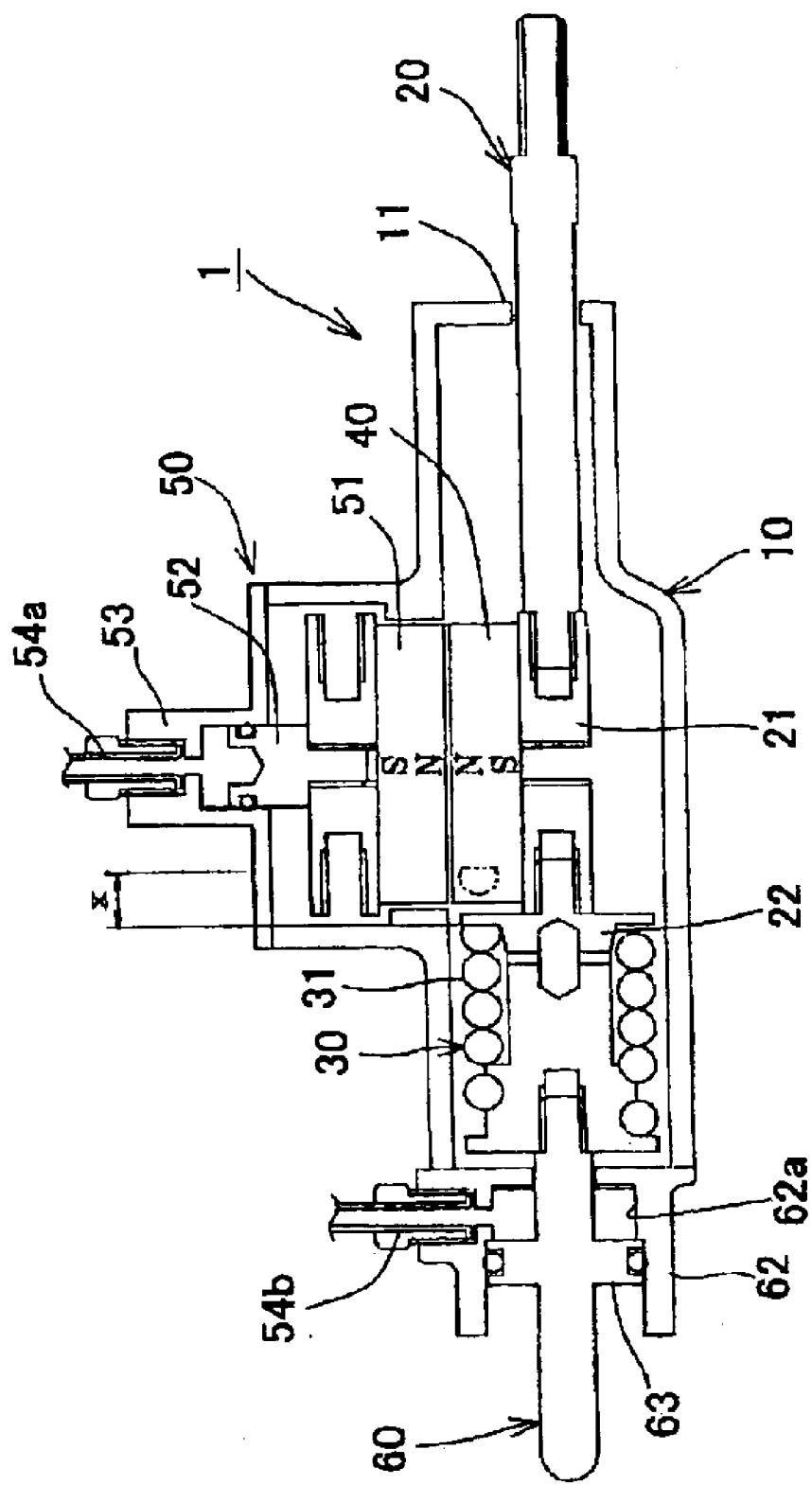
FIG.3 is a schematic sectional view showing an inner structure in a movement state of the booster relating to the embodiment.

The present invention will be explained further in detail below based on an embodiment shown in drawings. FIG. 1 to FIG. 3 are views showing a booster 1 relating to an embodiment of the present invention. The booster is structured including a casing 10, an input rod 20 as an inputting member, an output application member 30, a first permanent magnet 40, an amplification transmission member 50, and an output rod 60 as an outputting member.

The casing 10 is made of a non-magnetic material. This is to prevent generation of bias in the direction of movement of the input rod 20 influenced by a magnetic field of the first permanent magnet 40 since the first permanent magnet 40 is provided only one in this embodiment, when the input rod 20 moves in the casing 10. Needless to say, when a plurality of first permanent magnets are supported by the input rod 20 in a good balance as in another embodiment which will be described later, the casing 10 may be formed of a magnetic material. The casing 10 is formed in a tube shape with both open ends, and it is structured that at least a portion of the input rod 20 is positioned in the casing 10 through an end 11, and at least a portion of the output rod 60 is positioned in the casing 10 through the other end 12. On the upper portion of the casing 10 in FIG. 1 to FIG. 3, a projecting part 13 is formed, in which provided is the amplification transmission member 50 which will be described later.

The input rod 20 is connected to an operation member such as a brake pedal and the like directly or indirectly via a link mechanism which is not shown, so that a force generated by operation of the operation member is inputted. A flat-shaped yoke 21 is connected to the front end of the input rod 20, so that the yoke 21 is positioned within the casing 10.

The first permanent magnet 40 is fixed on a surface (upper surface in FIG. 1 to FIG. 3) of the yoke 21. Therefore, the first permanent magnet 40 moves slidably along the axial direction in the casing 10 together with the yoke 21 according to the movement of the input rod 20. As for the first permanent magnet 40, as far as it can form a repulsive magnetic field between the first permanent magnet 40 and a second permanent magnet 51 constituting the amplification transmission member 50, its arrangement of magnetic poles is not limited. However, in the present embodiment, as shown in FIG. 2 and FIG. 3, since the second permanent magnet 51 is provided to position on the outside of the first permanent magnet 40 when the first permanent magnet 40 moves forward at a predetermined distance, the first permanent magnet 40 is magnetized perpendicular to the direction of movement of the input rod 20 in FIG. 2 and FIG. 3. Further, the first permanent magnet 40 may be a magnet with two magnetic poles (N pole and S pole), or a dipolar magnet or a multipolar magnet with four magnetic poles or more composed of plural magnets connected with each other, and plural magnetic poles are arranged on the upper surface and the bottom surface respectively (refer to FIG. 1). A dipole magnet with four magnetic poles is preferable in view of effective utilization of the magnetic field. Examples of magnetic pole arrangement of the first permanent magnet 40 and the second permanent magnet 51 which are adoptable in the present embodiment shown in FIG. 4A to FIG. 4F for reference purposes. In FIG. 4A to FIG. 4F, an arrow shows a direction of magnetization.

The output application member 30 is not limited, as far as it can transmit a force to the output rod 60 through one output application channel according to the movement of the input rod 20. In the present embodiment, a coil spring 31 which is an elastic member is used as the output application member. The coil spring 31 is disposed along the direction of movement of the input rod 20 between the input rod 20 and the output rod 60 in the casing 10. More concretely, as for the output rod 60, an almost cylindrical spring receiving member 61 having a flange 61a on its periphery is connected to an end portion of the output rod 60 positioned in the casing 10 from the other end 12. The coil spring 31 is disposed on the periphery of the spring receiving member 61, and contracts guided by the periphery of the spring receiving member 61. Further, a spring abutting member 22 having a flange portion 22b on the periphery of a projection 22a is provided at the top end of the yoke 21 provided on the input rod 20 to abut and push the coil spring 31.

An end 31a of the coil spring 31 is arranged at the position corresponding to the rear end side position of the second permanent magnet 51 composing the amplification transmission member 50 in a normal state, as shown in FIG. 2, and the other end 31b is disposed to abut on the flange portion 61a of the spring receiving member 61. Accordingly, in a normal state, the spring abutting member 22 arranged at the front end of the input rod 20 in the direction of movement and the coil spring 31 stay apart from each other. Accordingly, in the present embodiment, the spring abutting member 22 abuts on the end 31a of the coil spring 31 only when the input rod 20 moves forward at a predetermined distance, so that the input load can be transmitted to the output rod 60. Needless to say, this is only an example, and depending on the usage and type of the operation member applying an input load to the input rod 20, the structure may be acceptable that the end 31a of the coil spring 31 abuts on the spring abutting member 22 of the input rod 20 in a normal state Needless to say, the output application member 30 is not limited to a member composed of an elastic member such as the coil spring 31 and the like, and it is possible to adopt a linking mechanism or a mechanism in which an elastic member such as a coil spring and the like is put together with the linking mechanism.

The amplification transmission member 50 includes the second permanent magnet 51 provided in the projecting part 13 formed on the side face between the end 11 and the other end 12 of the casing 10. The second permanent magnet 51 is provided to position on the side outer than the first permanent magnet 40 with regard to the axial center of the input rod 20 when the input rod 20 moves forward at a predetermined distance. As shown in FIG. 1, a difference in level 13a is provided in the projecting part 13, and the lowest limit of the second permanent magnet 51 is restricted by the difference in level 13a. Further, the second permanent magnet 51 is provided so that when it confronts with the first permanent magnet 40, the same magnetic poles face each other to form a repulsive magnetic field between the first permanent magnet 40 and the second permanent magnet 51. With this structure, when the first permanent magnet 40 moves forward at a predetermined distance together with the input rod 20 and confronts with the second permanent magnet 51, the second permanent magnet 51 receives a repulsive force in the direction substantially perpendicular to the direction of operation of the input rod 20.

An end of a first piston 52 is connected to the second permanent magnet 51 through a yoke 51a. The first piston 52 is disposed slidably in a first cylinder 53 with a flange, which is connected so as to close the projecting part 13 formed in the casing 10. Accordingly, the first piston 52 slides upward in FIG. 2 and displaces in the first cylinder 53 due to a repulsive force received by the second permanent magnet 51.

An end 54a of a pipe 54 is connected to the upper end portion of the first cylinder 53 to communicate to the inside of the first cylinder 53. An other end 54b of the pipe 54 is connected to a pressure chamber 62a which is a side portion of a second cylinder 62 connected to the other end 12 of the casing 10 to close thereof, and which is partitioned by a second piston 63. The output rod 60 is disposed in the second cylinder 62, and the second piston 63 is provided on the outer periphery of the output rod 60 to have a structure that the second piston 63 can move slidably in the second cylinder 62. Liquid 55 such as oil or the like is filled hermetically in the first cylinder 53, the pipe 54 and the second cylinder 62. Accordingly, when the liquid 55 is pushed by the first piston 52, the second piston 63 is pushed via the pipe 54 due to the hydraulic pressure. Incidentally, the output rod 60 is connected to a master cylinder of a brake system or the like.

When the pipe 54 has many bendings, there arises pulsation and whirlpools and so on in the sealed liquid, which might cause power transmission loss. Therefore, it is preferable to use the pipe 54 formed in a curve with a curvature as large as possible between the end 54a and the other end 54b as shown in FIG. 1 to FIG. 3. Further, a large diameter pipe is preferably used for the pipe 54 when used for a brake system.

According to the booster 1 relating to the present embodiment, by operation of the operation member such as the brake pedal, the operational force is transmitted to the input rod 20 directly or indirectly, and the input rod 20 moves forward in the casing 10. When the input rod 20 moves forward, the first permanent magnet 40 fixed on the input rod 20 comes close to the second permanent magnet 51.

When the spring abutting member 22 provided on the front end of the input rod 20 via the yoke 21 abuts on the coil spring 31, a force applied to the input rod 20 is transmitted to the output rod 60 while compressing the coil spring 31. Further, the first permanent magnet 40 comes close to the second permanent magnet 51, the repulsive magnetic field becomes strong, and an amplified force larger than the inputted force is generated due to the magnetic energy. When both permanent magnets face each other completely, the second permanent magnet 51 receives the maximum repulsive force. Thereby, the first piston 52 is displaced, the repulsive force (amplified force larger than the input force) received by the second permanent magnet 51 is converted to a hydraulic pressure to pressurize the pressure chamber 62a of the second cylinder 62 and to push the back face side of the second piston 63 so that a force based on the repulsive magnetic field is transmitted to the output rod 60. At this time, when a pressure receiving area of the second piston 63 is larger than a pressure receiving area of the first piston 52, a force which is further larger than the repulsive force received by the first piston 52 via the second permanent magnet 51 in proportion to the difference in area, transmits to the second piston 63 as a hydraulic pressure. As a result, a force applied to the input rod 20 is transmitted via the coil spring 31 and, at the same time, a force amplified by the amplification transmission member 50 including the second permanent magnet 51 is transmitted to the output rod 60, while boosted.

TEST EXAMPLE

The ratio of the pressure receiving area Si of the first piston 52 to the pressure receiving area So of the second piston 63 is set to 1:3, a coil spring having a spring constant of k=300 N/mm is used as the coil spring 31, and an amount of displacement of the spring abutting member 22 of the input rod 20 until abutting on one end of the coil spring 31 is set to be 40 mm. Then, displacement-load characteristic until the amount of the compressive displacement x of the coil spring 31 becomes 10 mm (until the amount of displacement of the input rod 20 becomes 50 mm) is measured. Further, the condition is set in a manner that the first permanent magnet 40 and the second permanent magnet 51 face each other in a completely overlapped state seen on a plane view, when the amount of the compressive displacement x of the coil spring 31 reaches 10 mm (the amount of displacement of the input rod 20 reaches 50 mm). The result is shown in FIG. 5.

Incidentally, an input load Fi to the input rod 20 is set as Fi=3000 N at maximum. Note that in FIG. 2 and FIG. 5, Fmx indicates a force in the forward direction (in the direction of movement of the input rod 20) of the first permanent magnet 40, Fmz indicates a force of the second permanent magnet 51 acting upward in FIG. 2 by a repulsive magnetic field, Fo1 indicates a force received by the second piston 63, Fo2 indicates a force received by the output rod 60 when the input rod 20 abuts on the coil spring 31, and Fo indicates an output load of the output rod 60.

Figure 5:
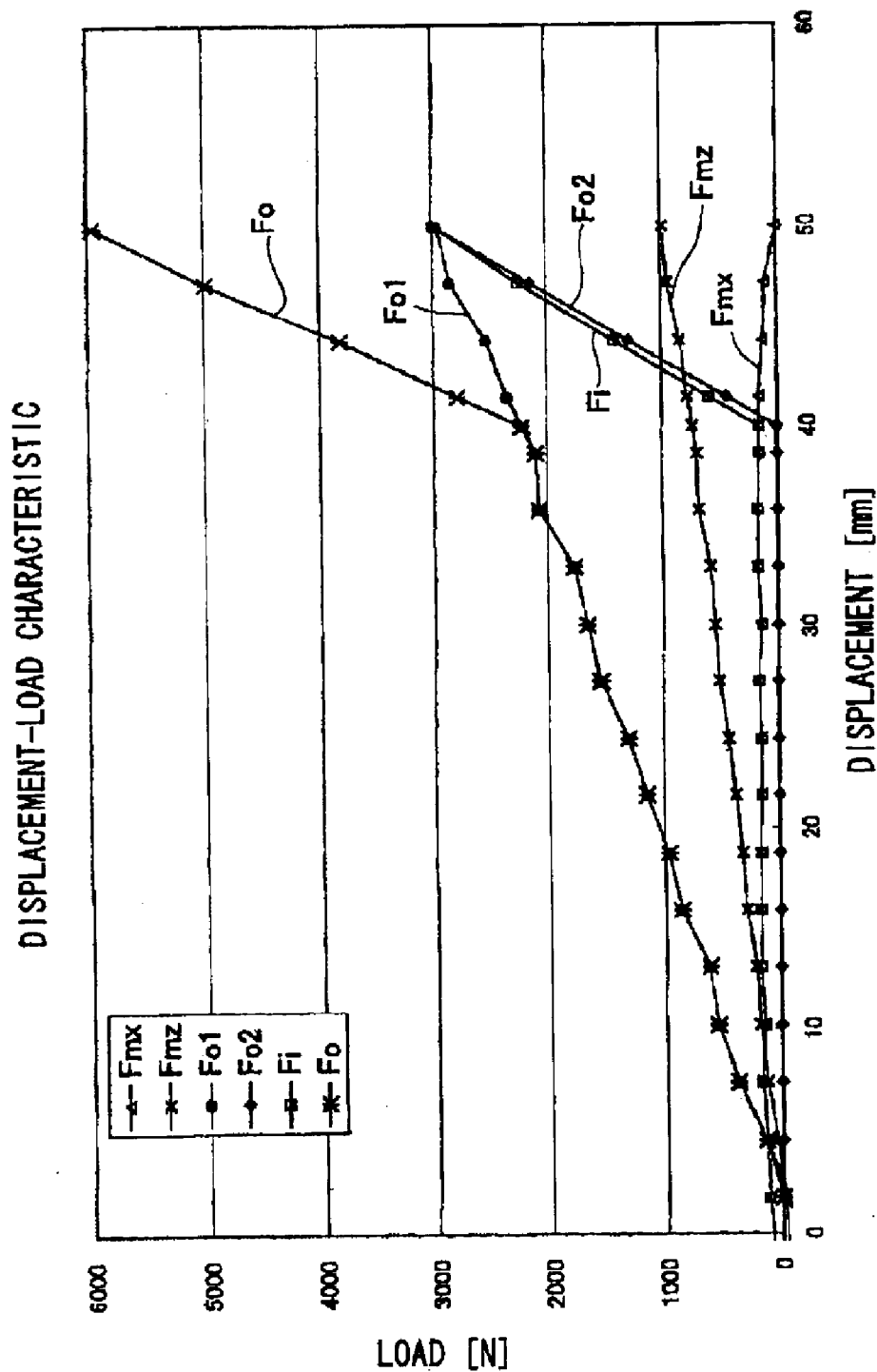
FIG. 5 is a chart showing a displacement-load characteristic of a test example in the embodiment.

As shown in FIG. 5, since the input rod 20 does not abut on the coil spring 31 until the amount of displacement reaches 40 mm, the input load continues at an extremely low load until the amount of displacement reaches 40 mm. When the amount of displacement reaches about 40 mm to 50 mm, the input load becomes 3000 N. With this figure, the force Fo2 transmitted through the output application member 30 including the coil spring 31 is 0 until the amount of displacement reaches 40 mm, follows to the input load from the amount of displacement of 40 mm and reaches 3000 N at the amount of displacement of 50 mm, so that the maximum input load Fi=3000 N is transmitted to the output rod as the force Fo2.

When the input rod 20 displaces, the first permanent magnet 40 displaces similarly, but the force Fmx is extremely small until it becomes 50 mm. On the other hand, with the approach of the first permanent magnet 40, the force Fmz of the second permanent magnet 51 escaping upward by the repulsive magnetic field becomes gradually larger until it reaches 1000 N.

The assist force Fo1 received by the second piston 63 increases in proportion to increase of the force Fmz. In the present test example, since the ratio of the pressure receiving area Si of the first piston 52 to the pressure receiving area So of the second piston 63 is set to 1:3, the force Fo1 received by the second piston 63 continues at a force of three times Fmz, and it reaches 3000 N when the amount of displacement of the input rod 20 reaches 50 mm.

Figure 6:
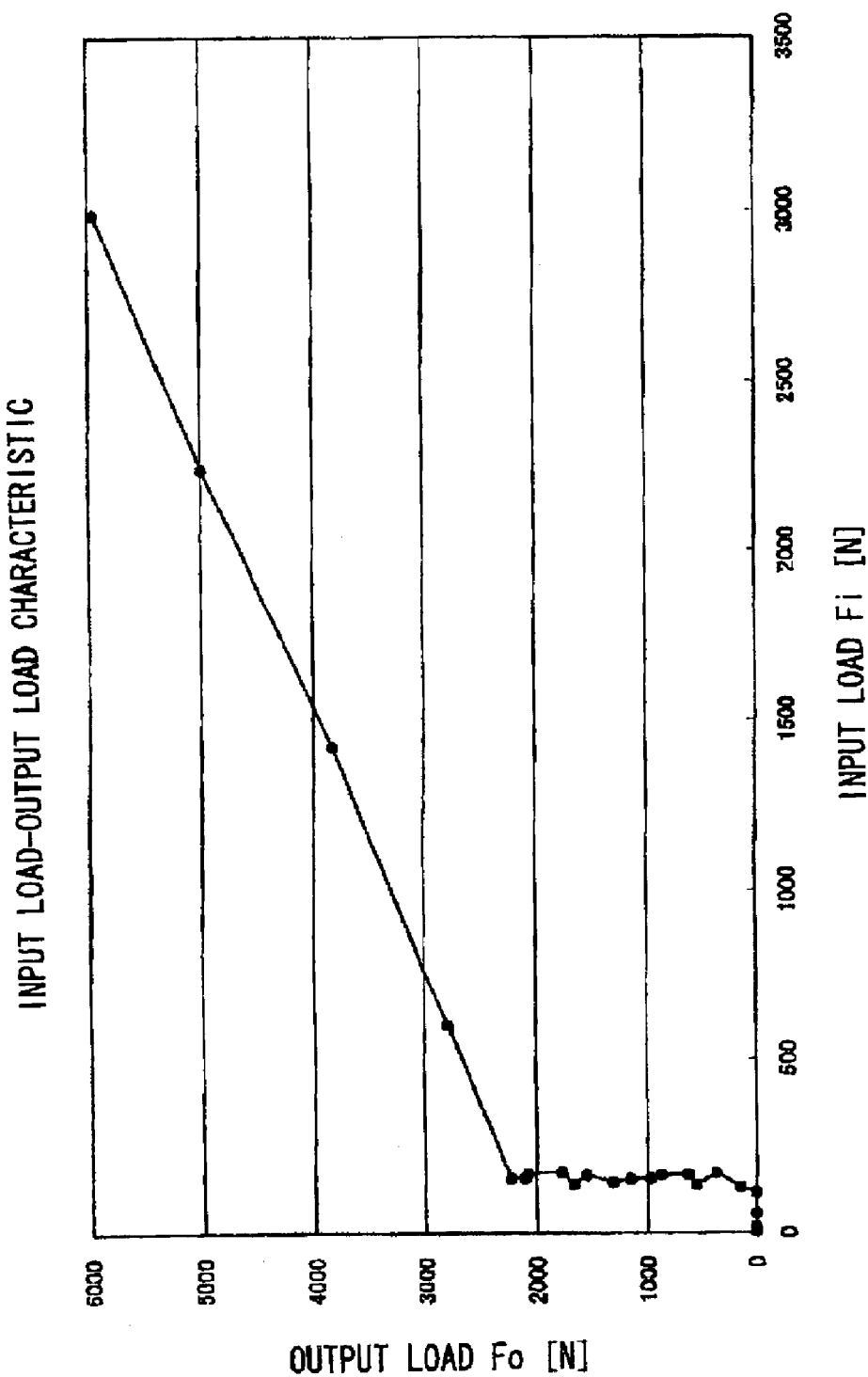
FIG. 6 is a chart showing an input load-output load characteristic of the test example in the embodiment.

Since the force Fo1 received by the second piston 63 is applied to the second piston 63 through a different channel from the output application channel by the output application member 30, the total output load Fo1 applied to the output rod 60 comes to Fo1+Fo2, and in the case of the present test example, the output load is boosted to 6000 N when the amount of displacement of the input rod 20 reaches 50 mm. When this is expressed as the output load Fo of the output rod 60 to the changes of the input load Fi of the input rod 20, it becomes as shown in FIG. 6. That is, although no generation source of a force driven by an independent drive system is used, displayed is a boosting characteristic substantially the same as the characteristic of various boosters conventionally used, for instance, for a brake system and the like.

Figure 7:
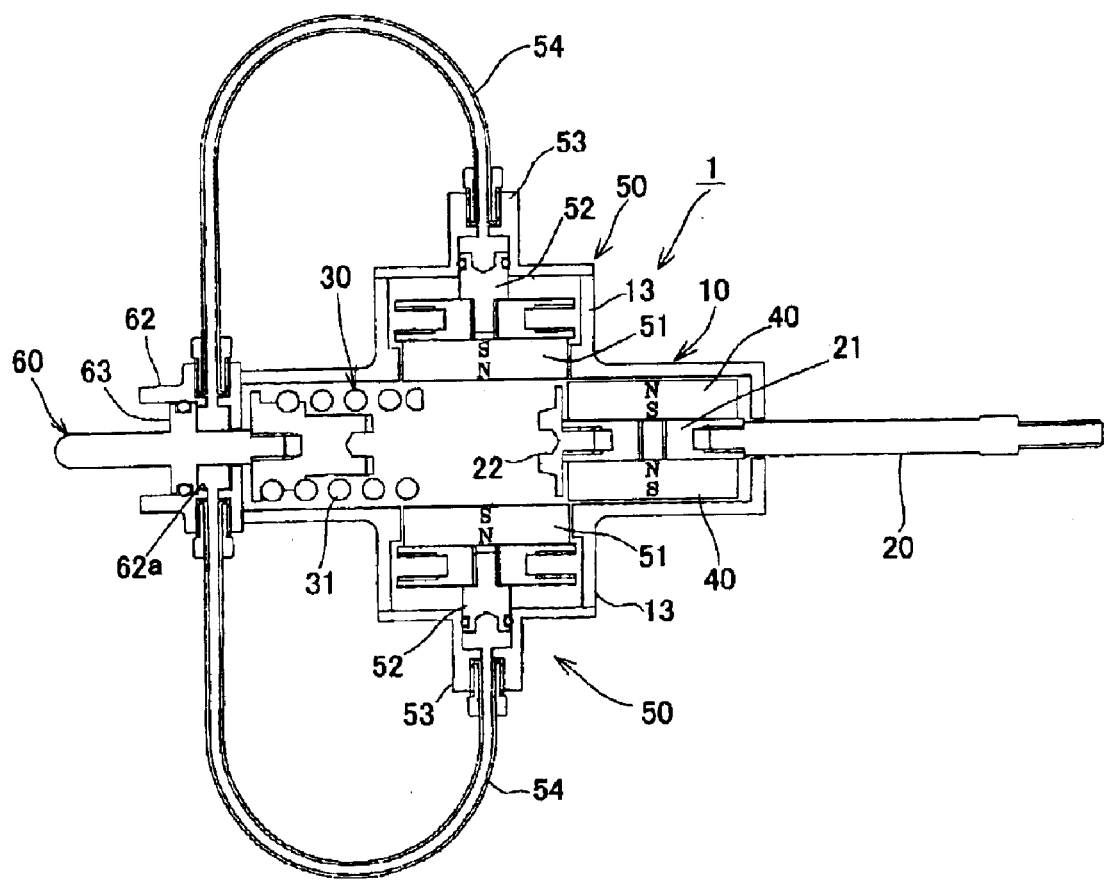
FIG. 7 is a schematic sectional view showing an inner structure of the booster relating to another embodiment of the present invention.

FIG. 7 is a view showing a booster 1 relating to another embodiment of the present invention. In this booster 1, two sets of the first permanent magnets 40 in the above embodiment are arranged vertically in FIG. 7 in a symmetrical manner, sandwiching the input rod 20. Matching this configuration, two sets of the amplification transmission members 50 are provided on the upper and the lower sides of the casing 10 in FIG. 7. Further, the size of the casing 10 is made larger than that in the embodiment shown in FIG. 1 to FIG. 3 in response to the number of articles to be housed. Moreover, it is structured that the projecting parts 13 are dispose on the upper and the lower sides of the casing 10 so that two sets of the amplification transmission members 50 can be disposed. It is needless to say that each of the second permanent magnets 51 provided in respective amplification transmission members 50 are arranged to face respective first permanent magnets 40 when the input rod 20 moves forward at a predetermined distance. Other features of the structure are the same as the embodiment described above, the structure of each first permanent magnet 40 provided in two sets, and the structure of each amplification transmission members 50 provided in two sets are the same as the structure of the above-described embodiment.

In the present embodiment, similarly to the above-described embodiment, as the input rod 20 moves forward, the input load is transmitted to the output rod 60 via the coil spring 31; and at the same time, through two sets of the amplification transmission members 50, an amplified force is applied from two channels to the second piston 63 of the output rod 60, and boosted.

However, in the present embodiment, since the force amplified from two channels is applied, when the amount of displacement of the output rod 60 is equal, the amount of displacement per piece of the first piston 52 becomes small compared to the case of the amplification transmission member 50 being one set. Accordingly, the distance when the second permanent magnet 51 connected to the first piston 52 is alienated from the first permanent magnet 40 due to the repulsive magnetic field becomes smaller than that in the case when the amplification transmission member 50 is one set, thereby suppressing lowering of the repulsive force by increase of the alienation distance of a pair of permanent magnets 40 and 51, so that more stable force can be transmitted to the outputting member.

Figure 8:
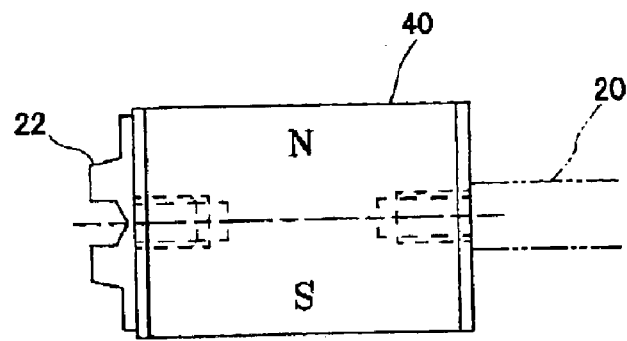
FIG. 8 is a view showing another example of the first permanent magnet adoptable to the another embodiment described above.
Figure 9:
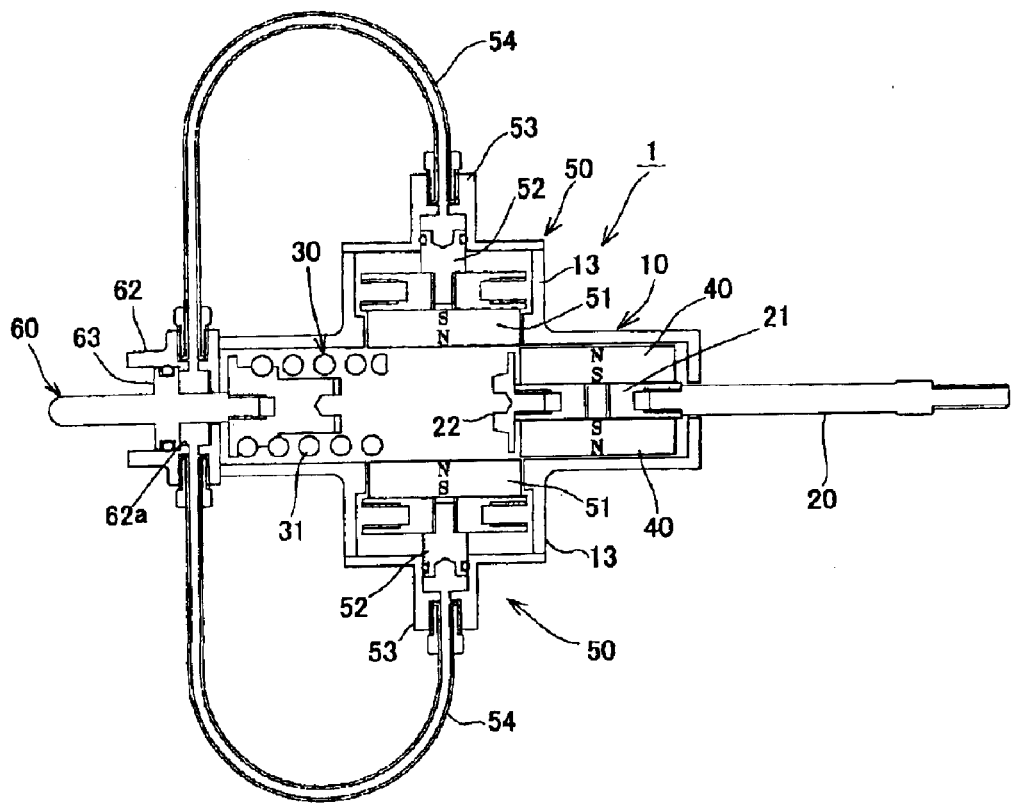
FIG. 9 is a schematic sectional view showing another example of the booster relating to another embodiment described above.

Further, since two sets of first permanent magnets 40 and two sets of the amplification transmission members 50 are arranged vertically in good balance with the axial center, it has an advantage that the slide resistance received between the input rod 20 and the casing 10 becomes small during forward and backward movement of the input rod 20. In FIG. 7, though two sets of the first permanent magnets 40 are used, one set of the first permanent magnet 40 can be used, even if two sets of the amplification transmission members 50 are used as shown in FIG. 8, by properly selecting the size and the direction of magnetization. Further, as shown in FIG. 9, the magnetic poles to be arranged in the confronting sides of the second permanent magnets 51 used in respective amplification transmission members 50 can be made to have the same polarity. In this case, before the first permanent magnets 40 provided in the input rod 20 enters into a space between the second permanent magnets 51, a repulsive magnetic field is formed by the second permanent magnets 51, which pushes the respective first pistons 52, thereby applying a preliminary load which pushes the second piston 63 of the output rod 60 from the back face side. Accordingly, this booster 1 is effective when used for an object which needs a preliminary load.

Figure 10:
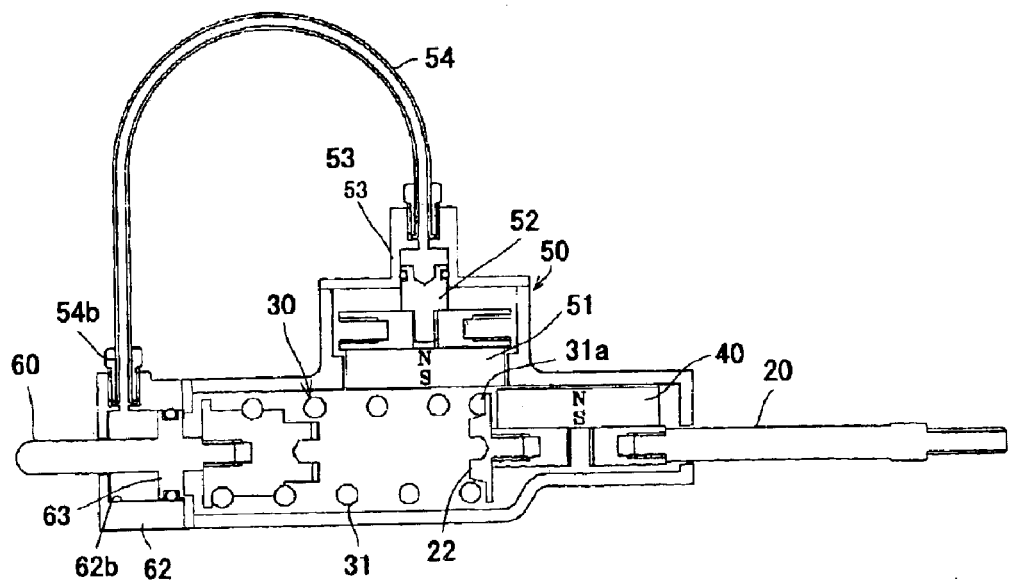
FIG. 10 is a schematic sectional view showing an example of the booster relating to still another embodiment of the present invention.
Figure 11:
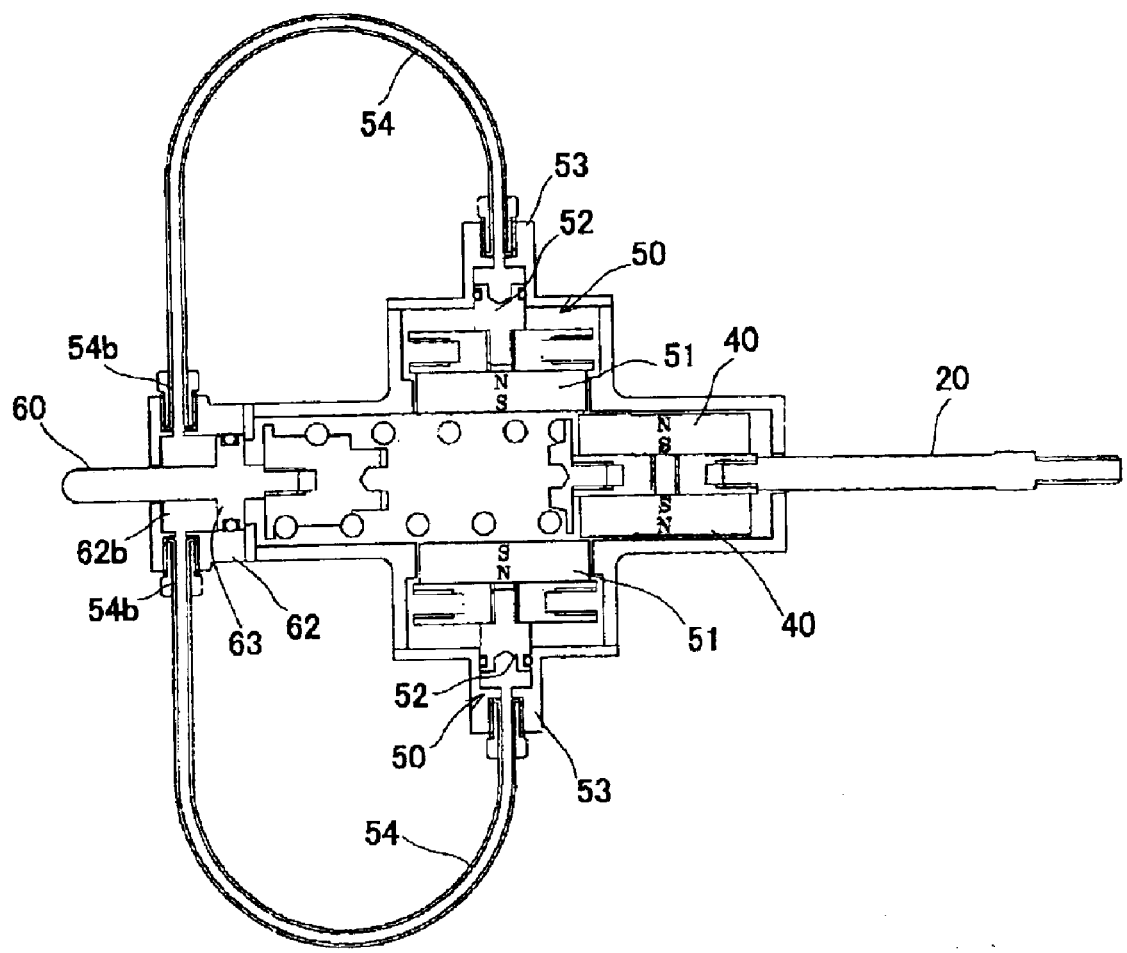
FIG. 11 is a schematic sectional view showing another example of the booster relating to still another embodiment of the present invention.

FIG. 10 and FIG. 11 are views both showing the booster 1 relating to a still another embodiment of the present invention. What is shown in FIG. 10 is nearly the same as the embodiment shown in FIG. 1 to FIG. 3. However, there are a few different points from the embodiment shown in FIG. 1 to FIG. 3 in that the first permanent magnet 40 and the second permanent magnet 51 are provided in a manner that poles different in polarity confront with each other so that an attractive magnetic field can be formed; since both permanent magnets 40 and 51 are provided so that the attractive magnetic field can be formed, the input rod 20 always tends to move in the direction of coming close to the second permanent magnet 51. In order to prevent this movement, the end 31a of the coil spring 31 abuts on the spring abutting member 22 of the input rod 20 in a normal state; and the other end 54b of the pipe 54 connectedly communicates to an opposite chamber 62b which is in a front face side of the second piston 63 in the second cylinder 62.

That is, when the input rod 20 displaces, the coil spring 31 is compressed, and the input force is transmitted to the output rod 60 as it is. At the same time, when the first permanent magnet 40 comes close to the second permanent magnet 51 in the direction of slide movement, an attractive force becomes so strong that the second permanent magnet 51 comes close to the first permanent magnet 40 in the direction perpendicular to the direction of slide movement. Thereby, the first piston 52 connected to the second permanent magnet 51 moves downward in FIG. 10, together with the second permanent magnet 51, so that the inside of the opposite chamber 62b formed in the second cylinder 62 is reduced in pressure. Therefore, the second piston 63 is attracted leftward in FIG. 10, so that the output rod 60 displaces. In this case also, a force larger than a force (input force) of the input rod 20 in the direction of slide movement is converted as an attractive force by the first permanent magnet 40 and the second permanent magnet 51. Accordingly, the output rod 60 can be operated by the amplified force. Further, in the embodiment shown in FIG. 10, since the first permanent magnet 40 tends to be attracted by the second permanent magnet 51, a preliminary load always attracted leftward FIG. 10 is applied to the output rod 60 and the second piston 63, which is effective when used for the object requiring a preliminary load.

In opposition to the embodiment shown in FIG. 10, an embodiment shown in FIG. 11 provides two sets of the amplification transmission members 50 to construct an attractive magnetic field by the first permanent magnet 40 and the second permanent magnet 51. In this embodiment, the respective first permanent magnets 40 come close to the respective second permanent magnets 51 in the direction of slide movement due to displacement of the input rod 20, which attracts the respective second permanent magnets 51 in the direction perpendicular to the direction of slide movement of the input rod 20 so that the inside of the opposite chamber 62b formed in the second cylinder 62 is reduced in pressure to displace the second piston 62 and the output rod 60 leftward in FIG. 11. It should be noted that in the embodiment shown in FIG. 11, the second permanent magnets 51 facing each other are disposed in a manner that the poles with the same polarity confront each other. As a result, in a state before the first permanent magnets 40 enter into a space between the second permanent magnets 51 due to displacement of the input rod 20, a repulsive magnetic field is formed between the second permanent magnets 51. On the other hand, since an attractive force works between the respective first permanent magnets 40 provided in the input rod 20 and the second permanent magnets 51, the attractive force and the repulsive force between the second permanent magnets 51 are canceled after all, so that it is structured that a preliminary load is not applied to the outputting member.

It should be noted that in the form shown in FIG. 11, when the second permanent magnets 51 disposed opposite to each other are provided to confront the magnetic poles different in polarity from each other, since the attractive force between the first permanent magnet 40 and the second permanent magnet 51 is superposed in addition to the attractive force between the second permanent magnets 51, a booster 1 having a large preliminary load can be provided.

Figure 12A:
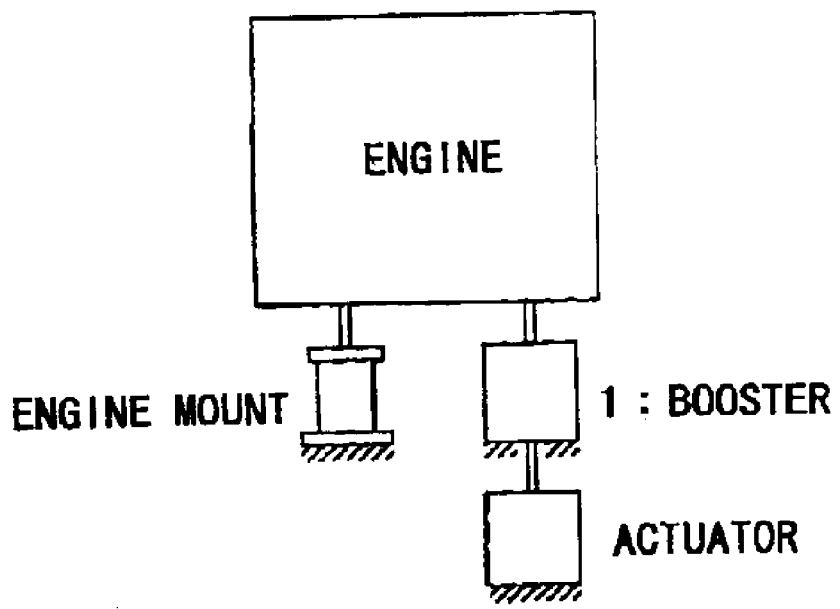
FIG. 12A and FIG. 12B are diagrams showing an arrangement structure when the booster of the present invention is applied to an engine suspension system for active-control.
Figure 12B:
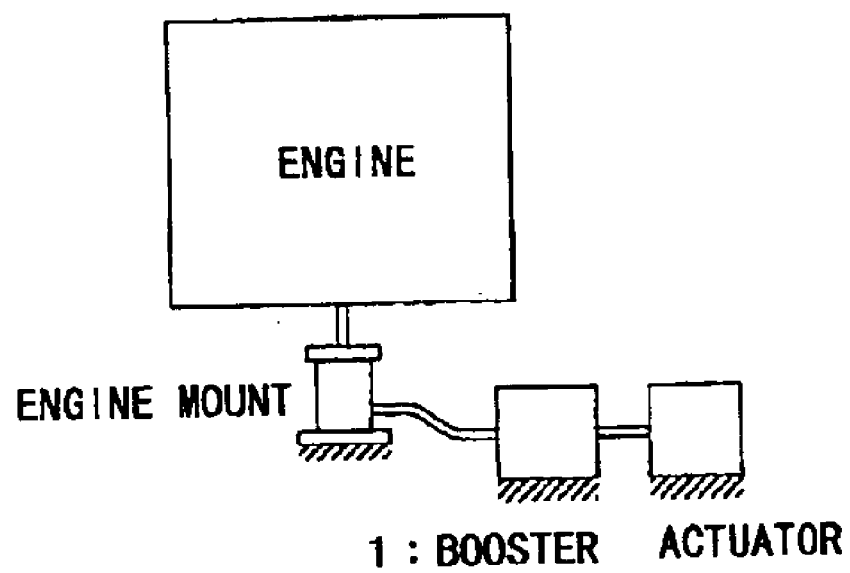
Figure 13:
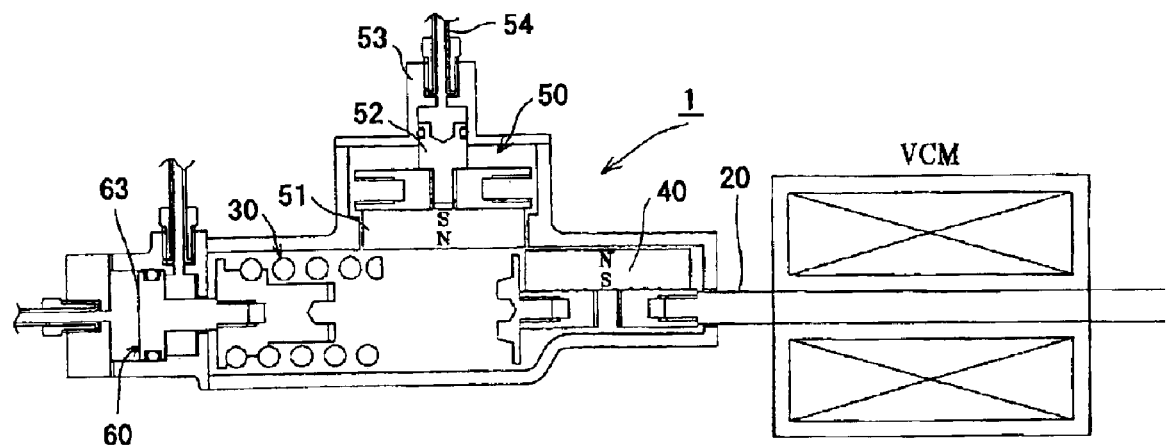
FIG. 13 is a view showing an example of concrete structure when the booster of the present invention is applied to an engine suspension system for active-control.

The booster of the present invention is used, for instance, a brake device, a steering mechanism, and so on. However, it is not limited to these usages, and can be attached, for instance, to an actuator to active-control vibration of an engine suspension system. For instance, as shown in FIG. 12A, the booster 1 of the present invention is laid between the actuator and the engine so as to amplify and transmit an input force of the actuator, or as shown in FIG. 12B, the booster 1 of the present invention is laid between an engine mount and an actuator. FIG. 13 shows its concrete structure, and the input rod 20 is provided to be movable forward and backward by a voice coil motor (VCM), so that a force inputted into the input rod 20 can be amplified and transmitted. Note that the diameter of the pipe 54 is properly selected lest pulsation or whirlpool should be generated according to input frequency from the VCM. Further, it is possible to include a characteristic suited to its purpose by changing the diameter of the pipe 54 to control the amount of flow.

It should be noted that the booster of the present invention is not limited to each embodiment described above, and needless to say, various application is possible. Though, for instance, in each embodiment, a mechanism in which liquid is filled hermetically in each of the cylinders 53, 62, and the pipe 54 to convert a force received by the second permanent magnet 51 into a hydraulic pressure to transmit the amplified force is adopted as the amplification transmission member 50, it is possible to use a gas to be filled instead of a liquid. Further, it is also possible to adopt any link mechanism (not shown) provided in connection with any portion on the outputting member (output rod 60) which has an interlocking member (not shown) connected to the second permanent magnet 51. Further, it is also of course possible to adopt still another member as far as the force received by the second permanent magnet 51 can be transmitted to the output rod 60 through a channel different from the output application member 30. Further, in the embodiments shown in FIG. 7 and the like, two sets of the first permanent magnet 40 and the amplification transmission members 50 are provided respectively; however, three or more sets of them can also be disposed. Since it has an advantage that deviation from the axial center of the inputting member (input rod 20) is more suppressed by increasing the number of sets to be disposed, the force can be transmitted to the outputting member more stably. It is possible to select any preferable combination of the number of sets of the first permanent magnets 40 and the amplification transmission members 50 to be disposed considering an object or a space for disposition for which the booster of the present invention is applied.

Figure 14:
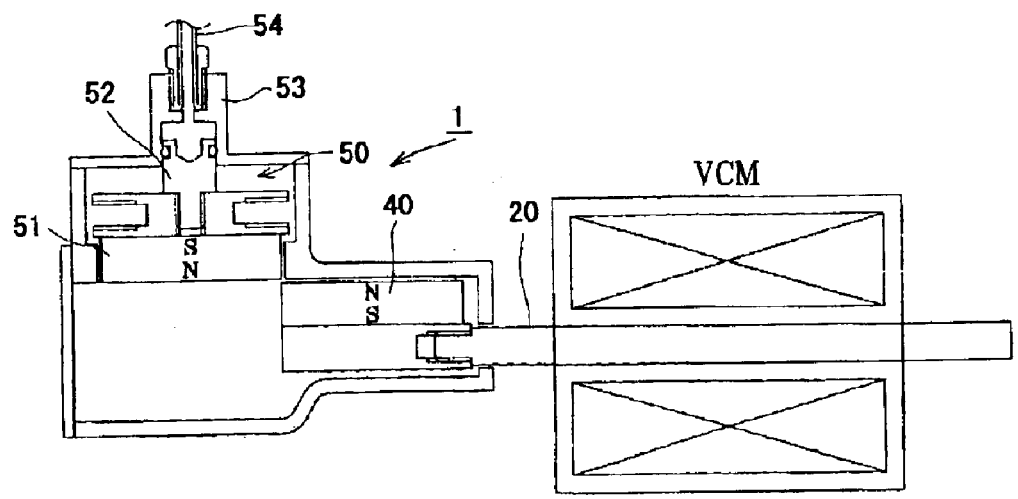
FIG. 14 is a view showing an example of structure not to dispose an output application member.

Further, although in all embodiment described above, the coil spring 31 is used to structure the output application member 30, no output application member 30 may be provided in the booster 1, as shown in FIG. 14, according to an object for which the booster 1 of the present invention is applied. In this case also, an input force applied to the first permanent magnet 40 is amplified by a magnet field formed by the second permanent magnet 51 in the direction perpendicular to the direction of the slide movement of the input rod 20 so that the amplified force can be applied to the outputting member. Incidentally, in FIG. 14, a voice coil motor (VCM) which is an actuator for active-controlling the vibration of the engine suspension system is provided, but it is off course possible to use the input rod 20 by connecting to other member.

The booster of the present invention includes a first permanent magnet provided in an inputting member, and a second permanent magnet able to face the first permanent magnet, so that an amplified force larger than the inputted force can be applied to the outputting member by the magnetic field formed by the first permanent magnet and the second permanent magnet. Therefore, the booster of the present invention requires no negative pressure source, nor hydraulic pressure source operating by another independent drive force different from the force to drive the inputting member, as is required by the conventional booster, so that boosting can be performed only by applying a force to drive the inputting member. Therefore, miniaturization of the booster, and reduction in production cost thereof can be realized.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A booster, comprising:
    a first permanent magnet mounted on an inputting member;
    an amplification transmission member, including a second permanent magnet arranged in a manner to face the first permanent magnet when the first permanent magnet moves by movement of the inputting member, and applying a force larger than an inputted force to an outputting member by the magnetic field formed by both permanent magnets; and
    an output application member for applying an output force to said outputting member by movement of said inputting member,
    wherein said amplification transmission member includes the second permanent magnet arranged in a manner to face the first permanent magnet when the first permanent magnet moves by movement of the inputting member, and applies a force larger than an inputted force to said outputting member through a channel different from the output application channel by the output application member due to a magnetic field formed by both of said permanent magnets.

2. The booster according to claim 1, wherein the second permanent magnet constituting said amplification transmission member is arranged on the outside of said first permanent magnet to apply the force of the magnetic field formed by both of said permanent magnets in a direction different from the direction of movement of the inputting member.

3. The booster according to claim 1, wherein said output application member comprises an elastic member connected directly or indirectly to the outputting member.

4. The booster according to claim 1, wherein the booster is structured that said amplification transmission member includes a piston slidable in a cylinder by a force received by the second permanent magnet due to the magnetic field formed by both of said permanent magnets and a pipe communicating to the cylinder at one end, and the outputting member includes a piston slidable in a cylinder communicating to the other end of the pipe, so as to convert the force received by the second permanent magnet into pressure for amplification.

5. The booster according to claim 4, said first permanent magnet and the second permanent magnet are arranged so that their same magnetic poles can face each other, the other end of the pipe is connectedly communicated to a pressure chamber located on the back face side of the piston out of two chambers formed in the cylinder divided by the piston of the outputting member, and the piston can be enforced by repulsive magnetic field received by the second permanent magnet.

6. The booster according to claim 4, wherein said first permanent magnet and the second permanent magnet are arranged so that their different magnetic poles can face each other, and the other end of the pipe is connectedly communicated to an opposite chamber located on the front face side of the piston out of said two chambers formed in the cylinder divided by the piston of the outputting member, and the piston can be enforced by reducing pressure in the opposite chamber by an attractive magnetic field received by the second permanent magnet.

7. The booster according to claim 4, wherein said booster is structured that liquid is filled hermetically in the cylinder in which piston of said amplification transmission member slides, in another cylinder in which the piston of the outputting member slides, and in the pipe, so that the force received by the second permanent magnet can be converted to a hydraulic pressure to transmit to the outputting member.

8. The booster according to claim 4, wherein a pressure receiving area of the outputting member is larger than a pressure receiving area of the piston of said amplification transmission member.

9. The booster according to claim 1, wherein said amplification transmission member is provided with a linking mechanism connected to any portion of the outputting member, the linking mechanism has an interlocking member movable by a force received by the second permanent magnet.

10. The booster according to claim 10, wherein a plurality of said amplification transmission members are provided, and the second permanent magnet disposed in each of said amplification transmission member is provided so as to face said first permanent magnet by movement of the inputting member.

11. The booster according to claim 10, wherein said booster is structured to apply a preliminary load to the outputting member by the magnetic field formed between the second permanent magnets in said plural amplification transmission members before said first permanent magnet provided in the inputting member is positioned between the respective second permanent magnets.

12. The booster according to claim 10, wherein said respective first permanent magnet in the inputting member has an arrangement of magnetic poles to be able to cancel the preliminary load acting to the outputting member by the magnetic field formed by the respective second permanent magnets before said respective first permanent magnet is positioned between the respective second permanent magnets of said plural amplification transmission members.

* * * * *